(12) United States Patent
Clasen et al.

(10) Patent No.: US 6,699,431 B2
(45) Date of Patent: Mar. 2, 2004

(54) METHOD OF PRODUCING AN ANODE FOR A CAPACITOR

(75) Inventors: Helge Clasen, Ulm (DE); Willy Knabe, Heidenheim (DE); Klaus Gnann, Ulm (DE); Josef Gerblinger, Wertingen (DE); Dieter Hahn, Schwandorf (DE)

(73) Assignee: Epcos AG, Munich (DE)

( * ) Notice: Subject to any disclaimer, the term of this patent is extended or adjusted under 35 U.S.C. 154(b) by 3 days.

(21) Appl. No.: 10/079,113

(22) Filed: Feb. 20, 2002

(65) Prior Publication Data

US 2002/0075628 A1 Jun. 20, 2002

Related U.S. Application Data

(62) Division of application No. 09/651,600, filed on Aug. 30, 2000, now Pat. No. 6,493,213.

(30) Foreign Application Priority Data

Aug. 30, 1999 (DE) .......................... 199 41 094

(51) Int. Cl.⁷ .................................. B22F 3/18
(52) U.S. Cl. .............................. 419/5; 419/7
(58) Field of Search .......................... 419/5, 7

(56) References Cited

U.S. PATENT DOCUMENTS

| | | |
|---|---|---|
| 3,412,444 A | 11/1968 | Klein |
| 3,465,426 A | 9/1969 | Baier et al. |
| 3,579,813 A | 5/1971 | Tomiwa |
| 3,903,589 A | 9/1975 | Klein et al. |
| 4,497,105 A | 2/1985 | Uemura |
| 4,603,467 A | 8/1986 | Kaneko |
| 4,660,127 A | 4/1987 | Gunter |
| 4,761,714 A | 8/1988 | Levasseur et al. |
| 4,907,130 A | 3/1990 | Boulloy et al. |
| 5,075,940 A | 12/1991 | Kuriyama et al. |
| 5,122,931 A | 6/1992 | Shimada et al. |
| 5,357,399 A | 10/1994 | Salisbury |
| 6,139,593 A | 10/2000 | Kono |
| 6,221,530 B1 * | 4/2001 | Turner et al. ........... 429/229 |

FOREIGN PATENT DOCUMENTS

| | | |
|---|---|---|
| DE | 215 420 | 11/1984 |
| DE | 36 34 103 A1 | 4/1988 |
| DE | 199 27 909 A1 | 3/2000 |
| HU | 195 705 | 5/1986 |

* cited by examiner

*Primary Examiner*—Daniel J. Jenkins
(74) *Attorney, Agent, or Firm*—Laurence A. Greenberg; Werner H. Stemer; Ralph E. Locher

(57) ABSTRACT

A method of producing an anode for a capacitor, which includes the steps of molding a continuously deformable material onto a flat anode conductor and simultaneously externally shaping the material, and solidifying the material to form an anode body.

15 Claims, 3 Drawing Sheets

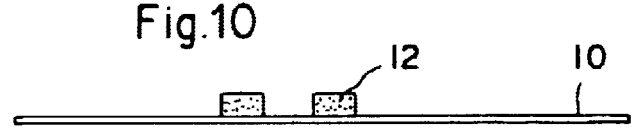
Fig.10
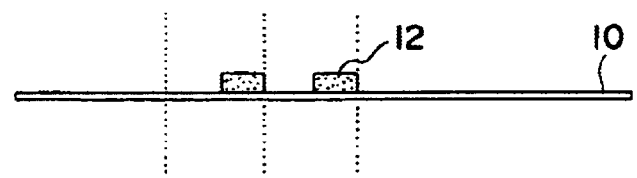
Fig.11
Fig.12
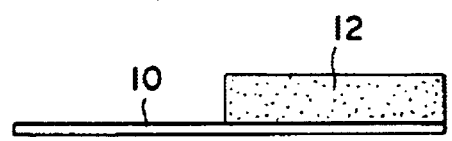
Fig.13
Fig.14
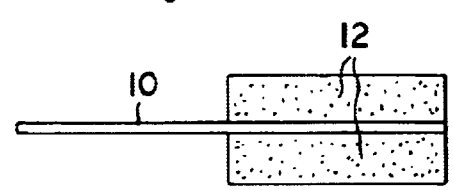
Fig.15
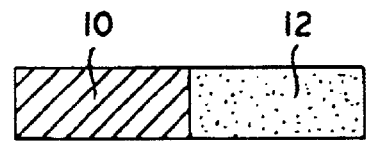
Fig.16
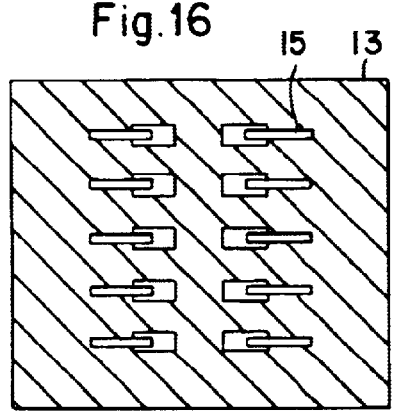
Fig.17
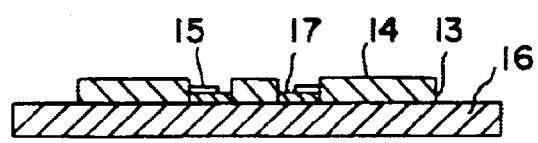
Fig.18

METHOD OF PRODUCING AN ANODE FOR A CAPACITOR

CROSS-REFERENCE TO RELATED APPLICATION

This application is a division of U.S. application Ser. No. 09/651,600, filed Aug. 30, 2000, now U.S. Pat. No. 6,493,213 B1.

BACKGROUND OF THE INVENTION

Field of the Invention

The present invention relates to a method of producing an anode for a capacitor.

In its preferred implementation, the capacitor is a chip capacitor. However, the present invention can also readily be applied to other capacitors, such as for example, capacitors without housings. A capacitor without a housing is of low structural height and is integrated, for example, in a hybrid circuit. However, the following text assumes that the capacitor according to the invention is a chip capacitor.

Chip capacitors, in particular tantalum chip capacitors, are distinguished by a high volume-specific capacitance-voltage product, also known as the "CV product." This means that in these capacitors the value of the volume-related product of capacitance and voltage which can be applied to the capacitor is particularly high. Further advantageous properties of chip capacitors include a stable thermal behavior and frequency response, a low residual current and a small loss factor.

Due to these excellent properties, in particular tantalum chip capacitors are used for numerous applications in a very wide range of fields. New applications, demanding conditions of use and an increasing tendency toward miniaturization in electronics mean that the demands imposed on chip capacitors are becoming ever greater.

A pertinent prior art assembly is illustrated in FIGS. 24–26. FIG. 24 shows a diagrammatic section through the structure of a conventional tantalum chip capacitor. FIG. 25 shows a side view of the anode body of that chip capacitor, and FIG. 26 is a plan view of the anode body.

The prior art chip capacitor comprises an anode body 1, a dielectric 2, and a layered cathode 3, which form an actual capacitor element.

In addition, there is a housing 4 which is responsible for important protective functions for the capacitor element.

A tantalum wire 5, which in the interior of the housing 4 is connected to a first metal connector 6. The wire 5 leads to the capacitor element comprising the anode body 1, the dielectric 2, and the layered cathode 3. By means of a conductive adhesive 8, the layered cathode 3 is connected to a second metal connector 7. The second metal connector 7, similarly to the metal connector 6, leads out of the housing 4.

Chip capacitors of this nature are produced in different sizes of housing 4, usually with standardized basic surface area dimensions and structural heights. Consequently, if a higher CV product is to be achieved, the volume taken up by the capacitor element or the anode body 1 contained therein must be increased.

Owing to the use of the tantalum wire 5 in the anode body 1 (in this respect see, in particular, FIGS. 25 and 26) as the anode-side conductor, the utilization of the housing can scarcely be increased further. This is because the free end of the tantalum wire 5 is welded to the metal connector 6 which, in the finished chip capacitor, is intended to provide electrical connection to an electronic circuit on a printed-circuit board, together with the other metal connector. In a design of this nature, the distance between the capacitor element and the housing wall is particularly great especially on the positive side. The distance between the positive metal connector 6 and the capacitor element or the anode body 1, which is formed by the tantalum wire 5, can scarcely be reduced further, for manufacturing reasons. In other words, the volume of the housing is only insufficiently utilized in the prior art chip capacitor.

East German Patent DD 215 420 discloses a tantalum chip capacitor in which an anode conductor is embedded in a two-part anode body produced by extrusion. That anode body and anode conductor preassembly is then sintered. The use of two pre-extruded partial anode bodies has the drawback that it is impossible to achieve an exact form fit between the anode body and the anode conductor, owing to manufacturing tolerances. Consequently, the electrical contact between the anode body and the anode conductor is impaired.

German published patent application DE 36 34 103 A1 discloses a tantalum capacitor in which a tantalum powder is pressed around a wire anode conductor. That capacitor has the drawback of a small contact area between the wire anode conductor and the anode body. The result is an increased resistance in the capacitor which may have an adverse effect on the electrical characteristics of the capacitor. This is an undesirable effect.

U.S. Pat. No. 3,903,589 discloses a tantalum capacitor, the anode of which is produced by immersing the anode conductor in a dispersion containing metal powder. When the anode conductor is pulled out of the dispersion, a drop remains hanging from the anode conductor, which is then dried and sintered. That tantalum capacitor has the drawback that the anode body cannot be produced with a defined geometry. Because of the absence of an optimized anode geometry and the broad tolerances, that prior art capacitor is subject to poor volume utilization.

SUMMARY OF THE INVENTION

The object of the invention is to provide a method of producing an anode for a capacitor which overcomes the above-noted deficiencies and disadvantages of the prior art devices and methods of this kind, and which has a large contact area between the anode conductor and the anode body, the anode body of which is of fixedly predetermined shape, and in which there is good electrical contact between the anode body and the anode conductor.

With the above and other objects in view there is provided, in accordance with the invention, an anode for an electrolytic capacitor, comprising:

a flat anode conductor; and an anode body of a continuously deformable material molded onto the anode conductor and solidified into a fixedly predetermined shape.

In other words, the anode has an anode body of fixedly predetermined shape and a flat anode conductor. The anode body is molded onto the anode conductor from a continuously deformable material which can be solidified.

There is also provided, in accordance with the invention, a capacitor, comprising:
the anode according to the above summary, wherein a second end segment of the anode conductor is shaped into a first terminal connector;
a dielectric enclosing the anode body; and
a layered cathode disposed on the dielectric and connected to a second terminal connector.

In other words, the anode body of the capacitor is surrounded by a dielectric, and a layered cathode is provided on the dielectric. A further end section of the anode conductor is shaped into a first terminal connector and the layered cathode is connected to a second terminal connector.

The anode according to the invention has the advantage that as a result of the entire anode body being molded onto the anode conductor in the form of a continuously deformable material, it is possible to form a homogeneous anode body which exhibits a good form fit with the anode conductor and good electrical contact with the anode conductor.

Furthermore, the anode according to the invention has the advantage that, as a result of the anode body being shaped with the aid of a continuously deformable material, it is possible to achieve any desired shape with the aid of suitable molds which are removed before or after solidification of the anode body. The material from which the anode body is formed may, for example, be a paste containing metal powder, a green film produced from the paste, or a suitable metal powder itself.

Due to the flat design of the anode conductor which is sintered into the anode body made from sintered tantalum powder, for example, a larger contact area between anode conductor and anode body is achieved compared with a sintered-in tantalum wire of the same cross-sectional area. The number of powder particles which are in contact with the surface of the anode conductor is increased, and consequently the mean length of the current paths between the dielectric and the anode conductor, which comprise tantalum particles which have been sintered together, is reduced. Consequently, it is possible to achieve reduced resistances and an increased capacitance at high frequencies.

Moreover, the use of a flat anode conductor in the anode body reduces the risk of local overheating at the transitions between the anode conductor and a fine network formed by the sintered tantalum particles when current is flowing. This is because higher current densities occur at these transitions than in the adjoining network. Local overheating of this type may be a cause of chip capacitors being suddenly and dramatically eroded.

The primary feature of the capacitor or anode according to the invention is in particular the production of a strong, large-area connection between the anode body, comprising an open-pored sintered body which forms the capacitance, and an anode conductor with a large surface area. For all these components, it is preferable to use tantalum or another suitable metal, such as niobium or a material which allows a layer with a high dielectric constant to be formed.

Furthermore, an anode in which the anode body completely surrounds an end section of the anode conductor is advantageous. In this way, it is possible to achieve optimum utilization or the surface area of the anode conductor for contact with the anode body. Furthermore, high mechanical stability of the anode is ensured in this way.

Furthermore, the invention also encompasses a method of producing an anode for a capacitor. The method comprises the following steps: molding a continuously deformable material onto a flat anode conductor and simultaneously externally shaping the material, and solidifying the material to form an anode body.

In a preferred embodiment of the method, the molding step comprises applying a paste of a binder system and a powder to the flat anode conductor, and the solidifying step comprises subsequently drying and sintering the paste.

In other words, the anode is produced by molding continuously deformable material, which can be solidified, onto a flat anode conductor with simultaneous external shaping, and is then solidified to form an anode body. The simultaneous molding of the material onto the anode conductor and the defining of the external shape of the anode body with the aid of a continuously deformable material obviates the need for complex post-machining processes for shaping the anode body.

A process in which a paste which contains a binder system and a powder is applied to the anode conductor and is then dried and sintered is particularly advantageous. In this process, the paste may be combined with the anode conductor to form an anode by means of various methods. By way of example, it is possible to use a paste which is known from document DE 199 27 909 A1 and which comprises a discrete phase containing a metal powder and a continuous phase containing organic compounds.

The capacitor according to the invention can be used as an SMD (SMD=Surface Mounted Device). The use of a paste simplifies the processing of high capacitance and ultra-high capacitance tantalum powders.

Furthermore, the invention provides a process for producing the anode according to the invention, in which a powder is pressed around a flat anode conductor, with the anode conductor projecting on one side. Then, the compact is sintered. The method according to the invention may advantageously be carried out in such a way that an anode conductor in the form of a strip-like metal sheet is pushed into a bed of the powder which is situated in a press mold, and then the pressing operation takes place.

The material tantalum which is preferably used for the anode conductor is extremely expensive, and consequently the strip used for the process should be as thin as possible. Conversely, the tantalum sheet used must be sufficiently mechanically stable to be able to be pushed into the powder bed and subsequently bent into a mechanically stable connector. Within these boundary conditions, strip-like anode conductors with a width of between 0.3 and 5 mm and a thickness of between 50 and 150 $\mu$m have proven suitable. These anode conductors have a width/thickness ratio of between 2 and 100.

The pressing of the powder may particularly advantageously be carried out by transverse pressing, that is to say by pressing transversely with respect to the direction in which the strip-like anode conductor extends.

The further manufacturing steps correspond to the steps used for the conventional manufacture of tantalum chip capacitors. Therefore, in the procedure known as forming, the dielectric is formed from tantalum pentoxide on the inner and outer surfaces of the sintered anode body. After the cathode layers have been applied, cathode terminal and housing are produced. In the configuration according to the invention, the anode connector made from tantalum, which is used as the positive electrical terminal, may undergo further treatment in order to be made suitable for soldering or adhesive bonding, and this statement also applies to the other exemplary embodiments.

As a modification to the above design according to the invention of the tantalum chip capacitor, the tantalum powder is also mixed with an additive which, due to its lubricating action, makes the pressing operation easier and more gentle on the press mold. The flow properties of the powder and the mechanical stability of the compact are also improved by the binding action of the additive. Camphor is a standard additive. Before the compact is sintered, the additive should be removed as far as possible without leaving any residues.

As an alternative to tantalum, it is also possible to use other suitable metals, such as for example niobium, or alloys of suitable metals, or other materials which are capable of forming a dielectric.

Other features which are considered as characteristic for the invention are set forth in the appended claims.

Although the invention is illustrated and described herein as embodied in a method of producing an anode for a capacitor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 7–13 are diagrammatic illustrations explaining a first exemplary method of producing an anode body;

FIG. 14 is a diagrammatic side view illustrating a modification of the process of FIGS. 7–13;

FIG. 15 is a plan view of the structure shown in FIG. 14;

FIGS. 16–23 are diagrammatic illustrations explaining a second exemplary process for producing an anode body.

Identical and functionally corresponding components are identified with identical reference numerals throughout the drawing figures. The prior art FIGS. 24–26 are described in the introductory text above, i.e., under the heading Field of the Invention.

DESCRIPTION OF THE PREFERRED EMBODIMENTS

Figure 1:
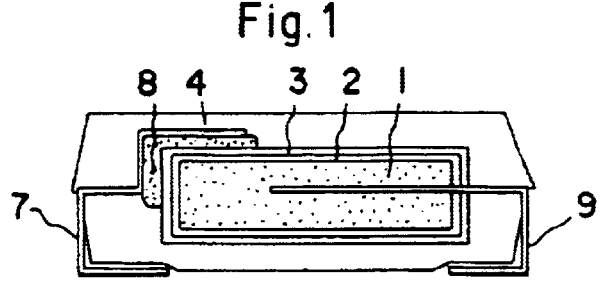
FIG. 1 is a diagrammatic vertical section through a first exemplary embodiment of the invention.

Referring now to the figures of the drawing in detail and first, particularly, to FIG. 1 thereof, there is seen a chip capacitor assembly according to the invention. The assembly includes a capacitor element comprising an anode body 1, a dielectric 2, a layered cathode 3 and a flat anode conductor 9 formed as a flat strip which extends into the anode body 1. The anode body 1 comprises a porous sintered metal body which, as will be explained in more detail below, is constructed from a paste which contains metal powder and is dried and sintered, in the process forming a firm, large-area connection to the anode conductor 9.

The term "flat" in this context connotes a structure with given area at which the anode body 1 can adhere. Typically, the flat conductor has a considerably greater width than height. In the illustrated embodiments, the flat anode conductor 9, at least in its surfaces that contact the anode body 1, is wider by a factor of approximately 10–20 than its height, or its width is greater than its thickness by at least one order of magnitude.

The anode conductor 9 is preferably made from tantalum, which is advantageously also used as the metal for the metal powder in the paste.

Figure 24:
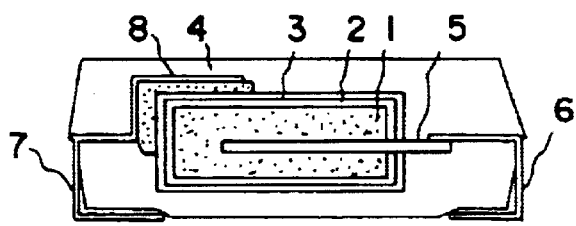
FIG. 24 is a diagrammatic section through a conventional tantalum chip capacitor.

As in the conventional chip capacitor shown in FIG. 24 the layered cathode 3 is connected to the metal connector 7 via a conductive adhesive 8.

Figure 25:
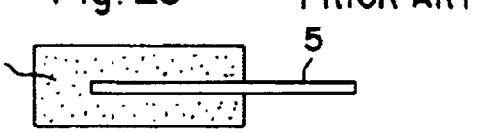
FIG. 25 is a side view of the anode body of the prior art chip capacitor.
Figure 26:
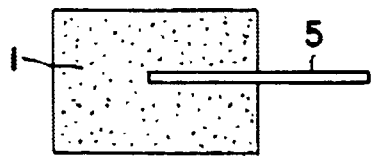
FIG. 26 is a plan view of the anode body.

The anode conductor 9 fulfills the functions of the tantalum wire 5 and the metal connector 6 in the prior art chip capacitor of FIG. 24: for this purpose, it is bent or shaped into a contact connector (cf. in particular FIGS. 2 and 3), with the result that the distance between the capacitor element and the edge of the housing 4 on the positive side can be reduced. Consequently, the volume of the housing 4 of the component is better utilized, in order advantageously to achieve a higher CV product. Thus, it is possible to select a smaller size of housing 4, while the volume of the anode body 1 remains constant. If the size of housing 4 remains the same, the invention allows the capacitor element or the anode body 1 to be larger than in the prior art (FIGS. 24–26).

Figure 2:
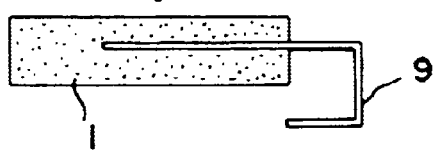
FIG. 2 is a side view of the anode body of the chip capacitor of FIG. 1.
Figure 3:
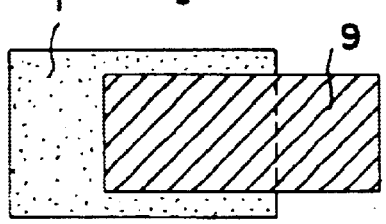
FIG. 3 is a plan view of the anode body.
Figure 4:
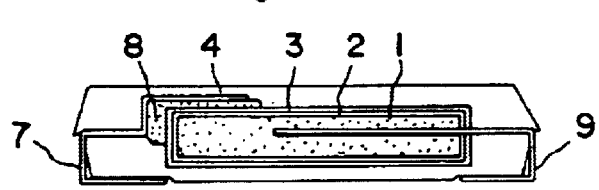
FIGS. 4–6 are diagrammatic views corresponding to FIGS. 1–3, respectively, of a second exemplary embodiment of the invention.
Figure 5:
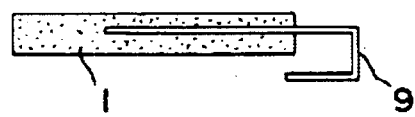
Figure 6:
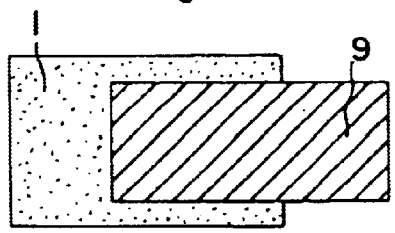

The chip capacitor according to the invention having the flat anode conductor 9 in the anode body 1 makes it possible to produce extremely shallow capacitor elements, as can be seen diagrammatically in FIGS. 4 to 6. FIG. 5, like FIG. 2, shows a side view of the anode body 1 with the anode conductor 9, while FIG. 6, like FIG. 3, shows a plan view of the anode body 1 with the anode conductor 9. However, FIGS. 3 and 6 show the entire extent of the anode conductor 9, even though it is in fact partially covered by the anode body 1.

The shallow construction, in accordance with the exemplary embodiment shown in FIGS. 4–6, results in a particularly large lateral surface area, which allows short current paths and improves the electrical properties. If appropriate, the extremely shallow capacitor elements may also be integrated in hybrid circuits without housings.

Figure 7:
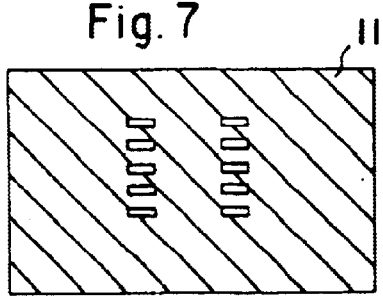
Figure 8:
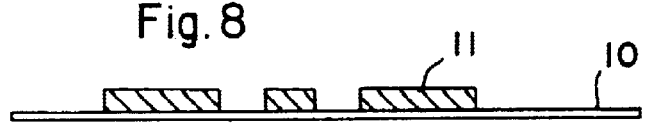
Figure 9:
Figure 19:
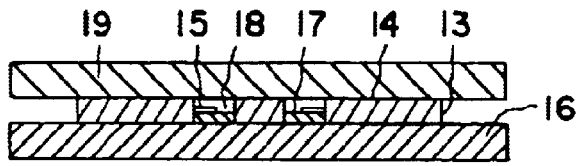
Figure 20:
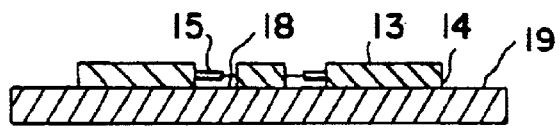

To produce an anode body, a paste comprising a binder system and a tantalum powder is printed onto a tantalum foil or a tantalum sheet 10 with a thickness of from 50 to 150 $\mu$m, using a stencil 11. FIG. 7 shows a plan view of the stencil 11, while FIG. 8 shows a side view of the tantalum sheet 10, together with the stencil 11. In FIG. 9, the stencil 11 has been filled with tantalum paste 12. The tantalum sheet 10 together with the tantalum paste 12 which has been doctored or printed on, is dried and sintered following the removal of the stencil 11. This results in the assembly shown in side view in FIG. 10.

Finally, the assembly shown in FIG. 10 is cut to length along the dotted lines (cf. FIG. 11), so that the result is anode bodies which are connected to the tantalum sheet 10. FIG. 12 shows a side view of an anode body of this type with a tantalum sheet 10, while FIG. 13 shows a plan view thereof.

If appropriate, the cutting to length to form the individual anode bodies (cf. FIG. 11), given sufficient drying, may also take place prior to sintering.

The subsequent process steps correspond to those used for the conventional manufacture of tantalum chip capacitors. Thus, in a procedure known as forming, the dielectric 2 is formed from tantalum pentoxide on the inner and outer surfaces of the sintered anode body 1. After the layered cathode 3 has been applied, the cathode terminal or metal connector 7 and housing 4 are produced. The anode connector made from the anode conductor 9 made from tantalum, which serves as the positive electrical terminal, may be treated further for the purpose of making it more suitable for soldering or adhesive bonding.

As a modification to the exemplary embodiment shown in FIGS. 7 to 13, it is possible for the tantalum paste 12 to be printed onto the tantalum sheet 10 on both sides, which may take place in a single operation. For printing in two steps, after the first side of the tantalum sheet 10 has been printed, the paste which has been applied to this side undergoes preliminary drying. Irrespective of whether the printing is carried out in one operation or in two operations, the ultimate result is an assembly as shown in FIGS. 14 and 15. FIG. 14 shows a side view and FIG. 15 shows a plan view of the tantalum sheet 10 with the anode body comprising two parts.

The anode body for the chip capacitor can also be produced by screen-printing, for which purpose a paste comprising a binder system and tantalum powder is screen-printed onto a tantalum foil or a tantalum sheet 10 with a thickness of from 50 to 150 $\mu$m. As in the previous examples, the tantalum sheet 10 with the screen-printed tantalum paste 12 is dried and sintered.

Following sintering, the tantalum sheet 10 is cut to length. In this way, individual anode bodies with an anode conductor comprising tantalum sheet 10 or tantalum foil corresponding to those shown in FIGS. 12 and 13 are obtained. In this case too, the cutting to length, given sufficient drying, may also take place prior to the actual sintering.

The further process steps are carried out in the manner explained above.

It is also possible to screen-print onto the tantalum sheet 10 on both sides, if appropriate, in one operation. If the printing is carried out in two steps, after the paste has been printed on the first side of the tantalum sheet 10, preliminary drying may be carried out. In this way, the ultimate result is the assembly shown in FIGS. 14 and 15, having the tantalum sheet 10 and the tantalum pastes 12 which have been sintered, to form anode bodies.

Figure 22:
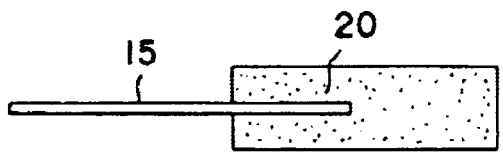
Figure 23:
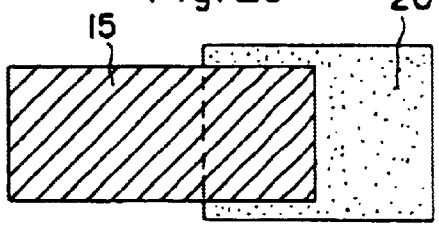

In the second exemplary embodiment of the invention which is explained with reference to FIGS. 16 to 23, an anode conductor is completely enclosed by a metal powder paste, so that the anode conductor can only project out of an anode body 20 produced from the metal powder paste by drying and sintering on one side, as is shown first of all in a side view and plan view in FIGS. 22 and 23, respectively. To produce an arrangement of this nature, it is possible to employ a multistage stencil process in which initially strips 15 of tantalum foil or tantalum sheet with a thickness of from 50 to 150 $\mu$m are placed between two perforated masks 13, 14. FIG. 16 shows a plan view of the perforated mask 13, together with the strips 15, while FIG. 17 shows a side view of the perforated masks 13, 14 together with the strips 15 on a first base plate 16. That part of the strip 15 which projects into the hole in the perforated masks 13, 14 may be supported by a spacer 17 (cf. FIG. 17). If appropriate, this spacer 17 may also be part of the base plate 16 or may be fixed thereto.

Figure 21:
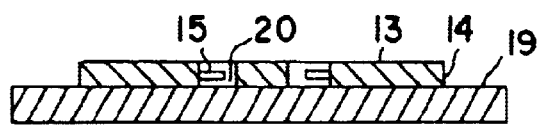

After preliminary drying of a paste 18 which has been doctored in (cf. FIG. 18), a further base plate 19 is fitted (cf. FIG. 19), the first base plate 16 together with the spacers 17 is removed (cf. FIG. 20), and metal powder paste is doctored in a second time (cf. FIG. 21). Following final shaping, drying and sintering are carried out. In this way, it is possible to obtain the arrangements shown in FIGS. 22 and 23 with the anode body 20.

Alternatively, to produce a chip capacitor, it is also possible for a paste comprising a binder system and a tantalum powder to be injected, pressed or cast around a strip of tantalum foil or tantalum sheet with a thickness of from 50 to 150 $\mu$m. Following final shaping, the anode body obtained in this way is dried and sintered. In this way, individual anode bodies with an anode conductor made from tantalum foil or tantalum sheet corresponding to FIG. 22 (side view) and FIG. 23 (plan view) are obtained, and these anode bodies are treated further in the manner explained above.

As a final option for producing an anode body, it is also possible for an elastic, film-like mass (green film) to be prefabricated from a paste which comprises a binder system and tantalum powder, and this mass is then cut to length and adhesively bonded to the tantalum foil or the tantalum sheet with a thickness of from 50 to 150 $\mu$m. Following drying and sintering, individual anode bodies with an anode conductor made from tantalum foil or tantalum sheet are obtained, as illustrated in FIGS. 22 and 23.

The anode bodies which are produced by the pressing process using powder which is described above look exactly like those illustrated in FIGS. 22 and 23.

We claim:

1. A method of producing an anode for a capacitor, which comprises the steps of:

molding a continuously deformable material onto a flat anode conductor and simultaneously externally shaping the material by applying a paste of a binder system and a powder on both sides of the anode conductor, and solidifying the material to form an anode body by subsequently drying and sintering the paste.

2. The method according to claim 1, wherein the applying step comprises printing the paste with a stencil.

3. The method according to claim 1, wherein the applying step comprises screen-printing the paste.

4. The method according to claim 1, wherein the paste is applied to the anode conductor via two masks, each assigned to one side of the anode conductor.

5. The method according to claim 4, which comprises supporting an end of the anode conductor, which projects beyond an edge of a perforation in the mask, with a spacer.

6. The method according to claim 1, wherein the applying step comprises a process selected from the group consisting of injecting the paste, pressing the paste, and casting the paste around the anode conductor.

7. The method according to claim 1, which comprises forming a green film from the paste, cutting to length, and adhesively bonding to the anode conductor.

8. A method of producing an anode for a capacitor, which comprises the steps of:

molding a continuously deformable material onto a flat anode conductor and simultaneously externally shaping the material, and solidifying the material to form an anode body; and pressing a powder around the anode conductor to form a compact, from which the anode conductor projects on one side, and subsequently sintering the compact.

9. The method according to claim 8, which comprises pushing the flat anode conductor into a bed of the powder prior to pressing step.

10. The method according to claim 8, which comprises providing the anode conductor as a strip-like metal sheet with a width/thickness ratio of between 2 and 100.

11. The method according to claim 8, wherein the anode conductor is selected from the group consisting of a tantalum foil and a tantalum sheet.

12. The method according to claim 8, wherein the powder is a tantalum powder.

13. The method according to claim 8, which comprises adding a lubricant to the powder as an additive with a lubricating action.

14. The method according to claim 8, which comprises adding a camphor to the powder as an additive with a lubricating action.

15. The method according to claim 13, which comprises removing the additive prior to sintering.

* * * * *